March 31, 1936. A. A. KUCHER Re. 19,908
REFRIGERATING MACHINE
Original Filed Oct. 22, 1921 4 Sheets-Sheet 1
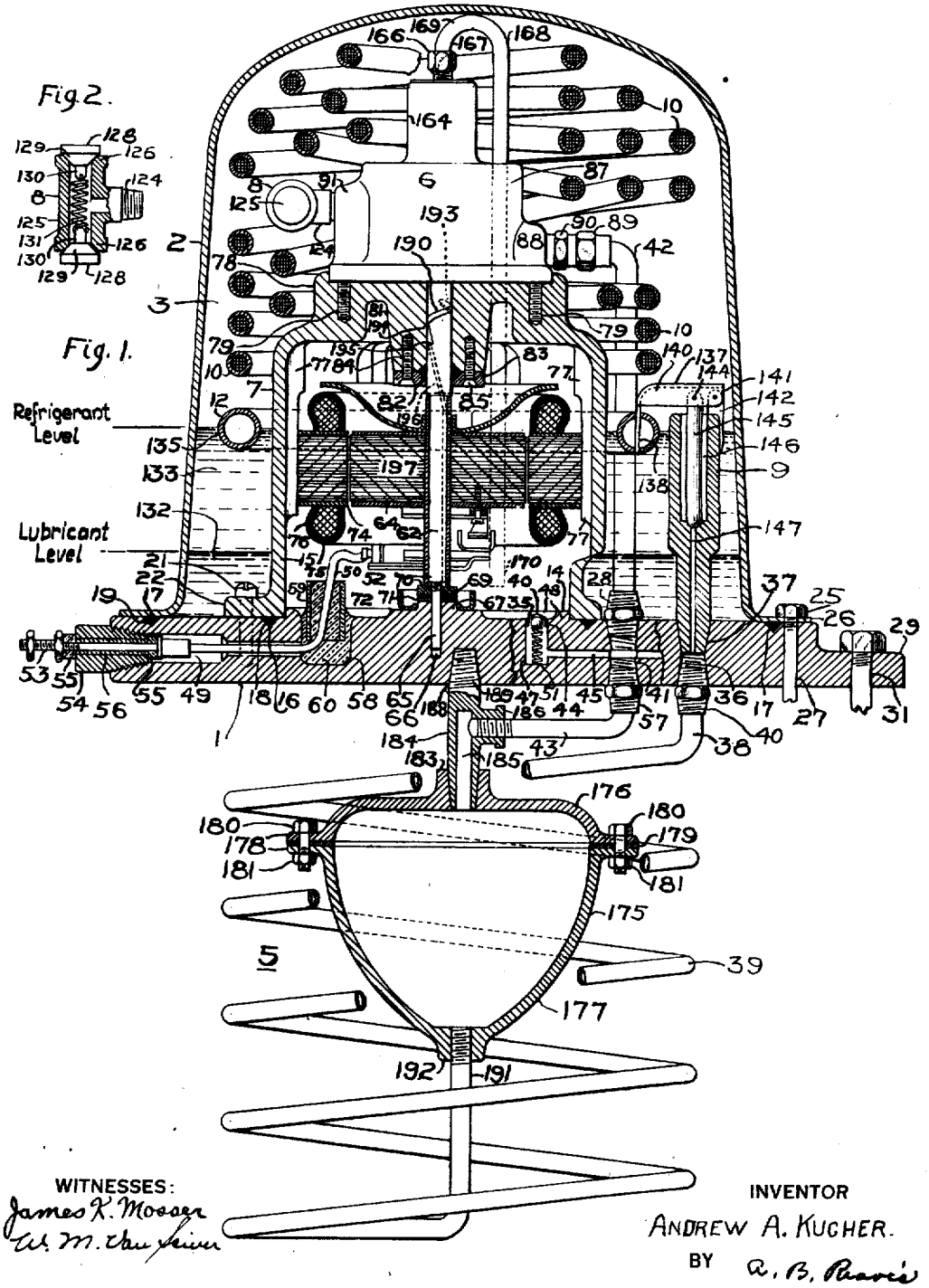
WITNESSES:
James K. Mosser
W. M. Chapman
INVENTOR
ANDREW A. KUCHER.
BY A. B. Rhodes
ATTORNEY March 31, 1936. A. A. KUCHER Re. 19,908

REFRIGERATING MACHINE

Original Filed Oct. 22, 1921 4 Sheets-Sheet 2

WITNESSES:
James K. Mosser
W. M. Van Sciver

INVENTOR
ANDREW A. KUCHER.
BY A. B. Rivis
ATTORNEY

March 31, 1936. A. A. KUCHER Re. 19,908

REFRIGERATING MACHINE

Original Filed Oct. 22, 1921 4 Sheets-Sheet 3

Lubricant Level.

INVENTOR
ANDREW A. KUCHER.
BY C. B. Rivers
ATTORNEY

March 31, 1936. A. A. KUCHER Re. 19,908

REFRIGERATING MACHINE

Original Filed Oct. 22, 1921 4 Sheets-Sheet 4

WITNESSES:
James K. Mosser
Wm. Van Leiner

INVENTOR
ANDREW A. KUCHER.
A. B. Rivis
ATTORNEY

Reissued Mar. 31, 1936

Re. 19,908

UNITED STATES PATENT OFFICE 19,908

REFRIGERATING MACHINE

Andrew A. Kucher, Dayton, Ohio, assignor to Westinghouse Electric & Manufacturing Company, a corporation of Pennsylvania Original No. 1,797,287, dated March 24, 1931, Serial No. 509,672, October 22, 1921. Application for reissue February 14, 1933, Serial No. 656,710

64 Claims. (Cl. 62—115)

My invention relates to refrigerating machines and particularly to relatively small refrigerating machines adapted for household use.

One object of my invention is to provide a device of the above-indicated character that shall have all of the component parts so constructed and related as to reduce the number and complicity thereof as much as possible, consistent with effective operation, and that shall facilitate its assembly and inspection to a high degree.

Another object of my invention is to provide a refrigerating machine that shall comprise a compressor of such character and relation to the other parts of the machine as to ensure effective and economical operation thereof.

Another object of my invention is to provide a novel lubricating system for a refrigerating machine that shall materially assist in the upkeep and running qualities thereof.

A further object of my invention is to provide a refrigerating machine that shall be quiet in operation.

Heretofore attempts have been made to provide relatively small refrigerating machines for household use, but there are many difficulties to the provision of a machine that is sufficiently economical and so otherwise sufficiently desirable as to be in demand by the very great number of probable users. The greatest of these difficulties has probably been the question of producing a machine that the average user could afford to purchase and operate. Other features, such as effective and quiet operation, facility of inspection and repair by the lay user and continuous satisfactory service, have been difficult to overcome.

It is the purpose of this invention to overcome the above-mentioned objections, and, while the principle employed is somewhat similar to that of other refrigerating machines, the carrying out of that principle has been effected in such manner as to provide a very effective and economical device.

In practicing my invention, I provide a refrigerating machine in which certain parts, that have heretofore been necessarily relatively widely separated and shut off from each other by barriers, are so constructed and related as to permit them to be enclosed in a single compartment or chamber. These parts are also so constructed and related as to reduce the space volume occupied thereby to substantially a minimum consistent with effective operation. Further, certain electric and fluid conductors, leading to the machine from the exterior thereof, are so grouped or disposed in a base member or plate as to eliminate them as factors in removing a cover member that may hence be readily mounted and removed for inspection and be more readily rendered fluid-tight. The above construction, in which the electric and fluid conductors are sealed into the base member and the cover member is devoid of openings to the outer air, assists materially in rendering the machine quiet in operation.

Quiet operation is mainly attained by the particular construction and disposition of a motor and a compressor, which construction also renders the machine more effective in proportion to its size.

A valve for the compressor, a novel lubricating system in which the refrigerating fluid and a lubricating fluid circulate through parts of the machine while intermixed, a separator for said fluids, a rotating fluid deflector for the motor and means for evacuating the motor casing, are also features which severally and collectively assist in accomplishing the objects and purposes of the invention.

Fig. 1 of the accompanying drawings is a side view, partially in section and partially in elevation, of a refrigerating machine embodying my invention.

Fig. 2 is a detail view, partially in section and partially in elevation, of a valve employed in my invention.

Figure 3:
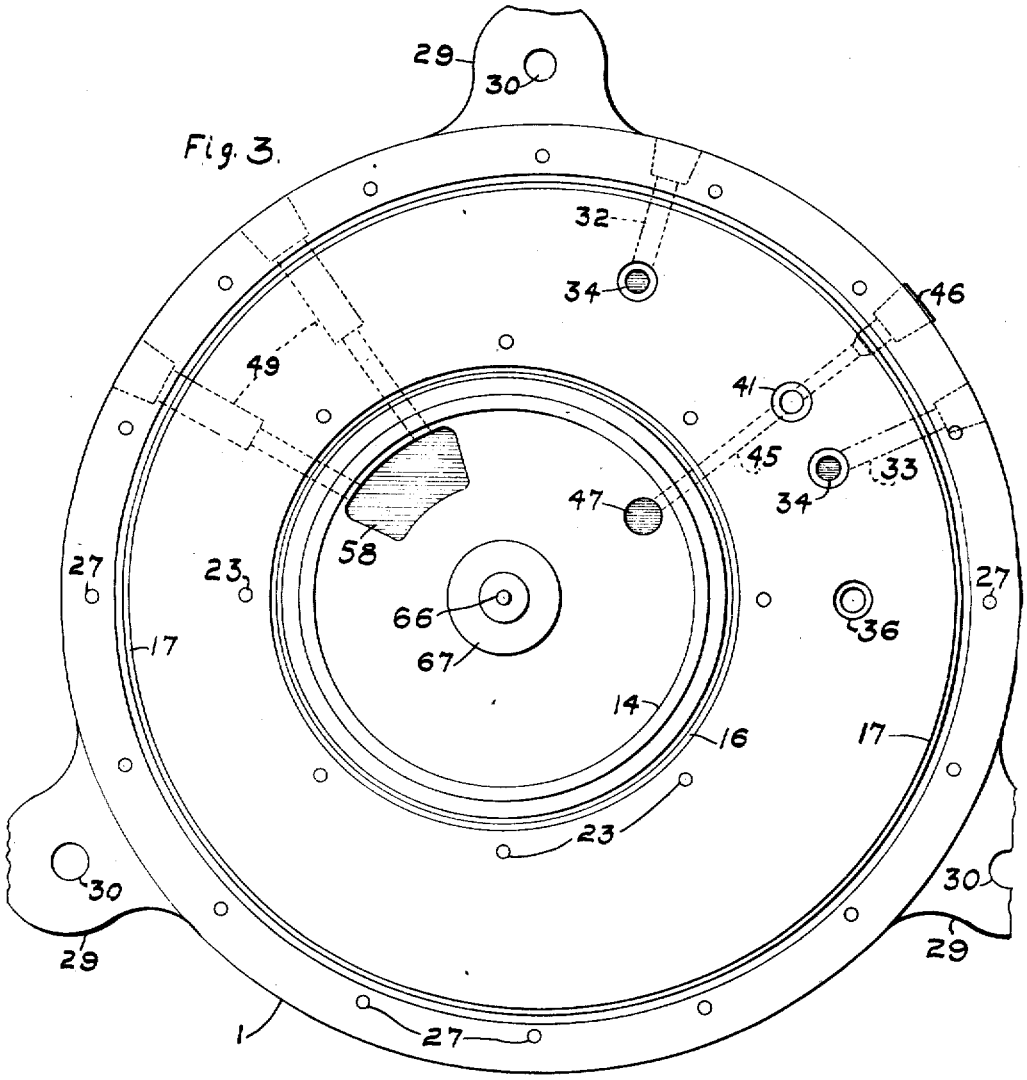
Fig. 3 is a slightly enlarged plan view of the base plate shown in Fig. 1.

The machine comprises, in general, a base member or supporting plate 1 and a cover member or shell 2 providing a condensing chamber 3, an expansion device 5, a compressor 6, an actuating electric motor 7 for the compressor, a check valve 8 for the compressor, an expansion valve 9, a cooling coil or tube 10, a fluid separator (Figs. 4 and 5), and a float member 12 for controlling the expansion valve 9.

Referring to Figs. 1 and 3, the base plate 1, that is preferably of discoidal form and constructed of any suitable material, such as cast iron or aluminum, is provided, on its upper side, with an annular flange 14 around which a casing 15 of the motor 7 is adapted to fit. The flange 14 and the motor casing 15 may be concentrically disposed about the longitudinal axis of the base plate 1, or be eccentrically disposed thereon, as shown. An annular groove 16 of V-shape in cross-sectional area and disposed concentrically with the longitudinal axis of the motor 7 in the base plate 1, and a similar groove 17 disposed concentrically with the longitudinal axis of the base plate in the upper surface thereof, are adapted to receive packing rings 18 and 19, respectively, that are preferably constructed of soft rubber and initially of circular cross-sectional area.

The packing ring 18 is compressed to conform with the groove 16 by means of screws 21 that extend through a flange 22 on the motor casing 15 and into holes 23 in the base plate to form a fluid-tight connection between the base plate and the motor casing 15. The packing ring 19 is similarly compressed, by means of screws or bolts 25 that extend through a flange 26 on the cover shell 2 and into openings 27 in the base plate 1, to form a fluid-proof connection between the base plate and the cover shell 2. Lugs 29 project from the outer periphery of the base plate 1 and are provided with openings 30 for the reception of screws or bolts 31 for mounting the machine on a refrigerator (not shown), or in any other desired position.

The base plate 1 is further provided with substantially radial bores or openings 32 and 33 that are disposed intermediate the upper and lower surfaces of the plate and are open only to the upper surface of the plate, at their inner ends by means of taps 34 into which the ends of the cooling tube 10 are mounted (not shown). The outer end of one of the openings 32 and 33 is adapted to receive a pipe connection from an external source of water, or other cooling medium, and the outer end of the other opening is similarly connected to provide an outlet for the cooling medium. An opening 36, extending between the upper and lower faces of the base plate 1, is tapped at its upper end to receive the lower end 37 of the expansion valve 9 and, at its lower end, to receive, by means of a union 40, the intake end 38 of a coiled tube 39 constituting a part of the expansion device 5.

An opening 41, similar to the opening 36, is also provided in the base plate to connect the intake port of the compressor 6, by means of a brass or copper tube 42 and unions 28 and 57, to a brass or copper exhaust or suction terminal tube 43 of the expansion device 5. A radial opening 45, that is provided with a plug 46 at its outer end, intersects the opening 41 to communicate with an opening or chamber 47 and, through a check valve 48 at the upper end of the latter, to communicate with the interior of the motor casing 15.

The check valve 48 comprises a preferably relatively thin pressed-metal cap 35 press fitted, or otherwise secured, in the upper end of the chamber 47 and provided with a central opening 40 in its transverse wall. A ball 44 is normally held in position against the transverse wall, to close the opening 40, by a compression spring 51 that extends between the ball 44 and the bottom of the chamber 47.

Radial openings 49, in the base plate 1, are provided for the reception of conducting leads 50 that extend from a current-collecting device 52, cooperating with the motor 7 to supply the latter with current, to terminal rods 53. The latter are disposed in preferably metal pressure-resisting plugs 54 that are threadably mounted in the outer ends of the openings 49 to assist in hermetically sealing the chamber 3 and are provided with insulating bushings 55 to insulate the rods 53 in spaced relation to the plugs 54. Packing members 56, preferably of soft rubber, are disposed in the plugs 54, around the rods 53 between the bushings 55.

The inner ends of the radial openings 49 communicate with a recess 58 in the base plate 1, in which an insulating tube or collar 59 surrounds the conducting leads 50. The recess 58 and the tube 59 are filled with a preferably insulating material 60 to prevent the passage of liquids along the leads 50. A rotatable shaft 62, preferably constructed of cold rolled or tool steel, on which a rotatable member 63 (Figs. 7, 8 and 9) of the compressor 6 and the armature 64 of the motor 7 is mounted, has a lower end portion 65, of reduced diameter, that is positioned in an opening 66 in a boss 67 on the upper surface of the base plate 1. A thrust bearing 69 for the shaft 62 comprises a washer or collar 70 secured to the shaft, as by screw-threading, a loose or floating collar 71 disposed between the collar 70 and the boss 67 and a lubricant cup 72 adapted to maintain the lubricant level above the bearing surfaces of the collars 70 and 71.

An annular laminated field magnet structure 74, supporting a field winding 75, is preferably press-fitted in position against, and spaced from the inner walls of the motor casing 15, by a plurality of vertical ribs 77 that are integral with the motor casing. The field winding 75 is impregnated or embedded in a body of insulating material 76, such as bakelite, to render the same proof against any fluids in gaseous or liquid form which might gain access to the motor casing.

The upper end of the motor casing 15 is provided with a seat portion 78 for the compressor 6, to which the latter is secured, as by screws 79, and a downwardly projecting bearing portion 81 for the shaft 62. A packing ring 82 is held in position around the shaft 62 by means of a ring 83 and screws 84 that extend through the rings 83 into the lower portion of the bearing portion 81.

A member 85, of substantially cup-shape, is secured to the shaft 62 beneath the bearing portion 81 and is formed to throw off or deflect any fluid that may escape from the compressor 6 along the shaft 62 and below the packing ring 82. When thus thrown off or deflected, the fluid will pass between the ribs 77 and the outer perimeter of the field magnet structure 74 to the bottom of the motor casing 15.

Figure 7:
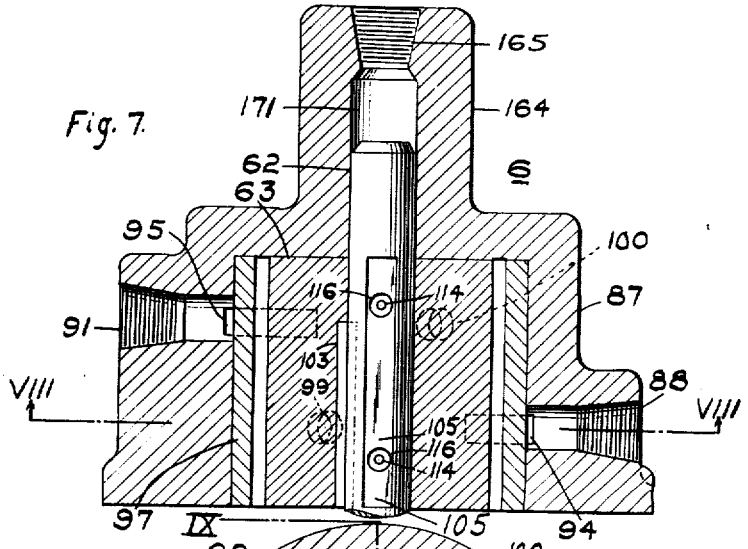
Fig. 7 is an enlarged side sectional view of a compressor as viewed in Fig. 1 and taken along the line VII—VII of Fig. 8.
Figure 8:
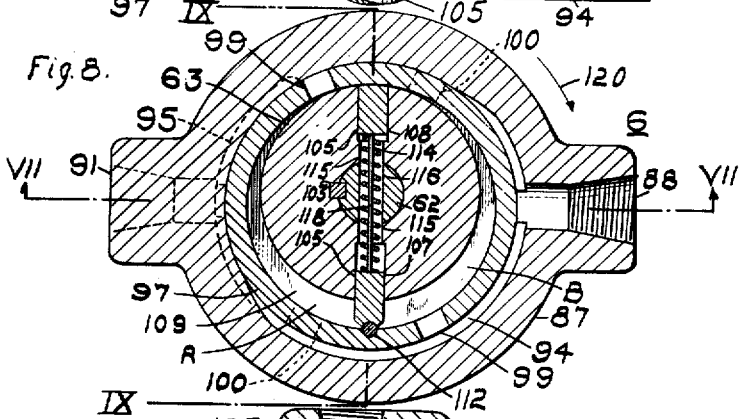
Fig. 8 is a view taken along the line VIII—VIII of Fig. 7.
Figure 9:
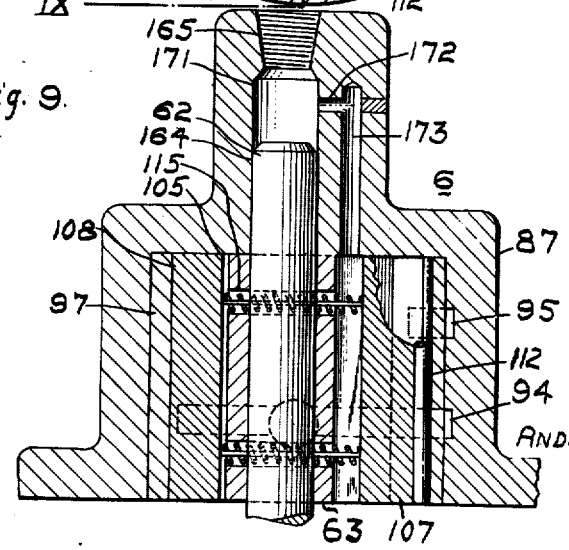
Fig. 9 is a view taken along the line IX—IX of Fig. 8.

As more clearly shown in Figs. 7, 8, and 9, the compressor 6 comprises an outer cylindrical member or casing 87 of any suitable material such as cast iron, brass or aluminum, having a screw-threaded inlet port portion 88 to which the tube 42 is connected, as by preferably brass cooperatively threaded coupling members 89 and 90, and a similar outlet port portion 91, longitudinally offset with respect to the inlet port 88, to which the check valve 8 is connected. The inner surface of the cylindrical member 87 is provided with longitudinally offset peripheral or arcuate grooves 94 and 95, which intercept the inlet and outlet ports 88 and 91, respectively, and extend for predetermined distances, to be hereinafter explained, on either side of the ports.

A second cylindrical member or rotor shell 97, preferably constructed of tool steel and closely fitting the bore of the casing 87, is provided with oppositely-disposed longitudinally-offset ports 99 and 100, that, respectively, communicate with the grooves 94 and 95 at their outer ends and with the interior of the rotor shell 97 at their inner ends.

The rotor or drum 63, preferably of steel, is concentrically mounted, as by a key 103, on the shaft 62, and, with the latter, is eccentrically related to the cylinder member 97. Radial slots 105 in the rotor 102 are adapted to receive radially slidable partition or blade members 107 and 108, preferably of Turon bronze, which divide the space 109, caused by the eccentricity of the rotor member 102 and the cylinder member 97, into chambers or compartments A and B. The blade 107 is pivoted or movably keyed to the cylinder member 97 by a pin 112. Rods 114 extend through openings 115, at the bottoms of the slots 105, and through openings 116 in the shaft 62, into proximate relation to the inner edges of the blades 107 and 108. Springs 118 surround the rods 114, in the openings 115 and 116, and exert outward pressure against the blades 107 and 108, the latter of which is rounded at its outer edge to slidably engage the inner surface of the cylinder member 97.

In operating the compressor 6, the shaft 62, the rotor 102 and the cylinder member 97 are simultaneously rotated in the direction shown by the arrow 120. As clearly shown in Figs. 7, 8, and 9, gases enter through the inlet port 88, groove 94 and port 99 into the chamber B during the period in which the chamber is increasing in its volumetric capacity. Shortly after the port 99 has passed the end of the groove 94, the port 100 of the chamber B communicates with the groove 95 and permits the gases to be forced, during the period in which its volumetric capacity is decreasing, from the chamber B, into the outlet port 91. The two chambers A and B operate in opposite phases, so that when chamber A is receiving gases, through the port 88, the chamber B is discharging gases through the port 91, and vice versa.

The check valve 8, Figs. 1 and 2, comprises a preferably cast brass member of substantially T-shape, that is drilled to tubular form, having a screw-threaded central leg or portion 124 for mounting in the exhaust port portion 91 and a cross or T-head portion 125 having ground valve seat portions 126 of substantially frustro-conical shape. Valve members 128, having portions 129 conforming to the seat portions 126, are also provided with apertured inwardly-projecting portions 130 between which a tension spring 131 is connected to hold the valve member 128 in position. This construction of the check valve renders the latter economical in manufacture, permits it to be accurately self-seating and so delicately responsive to fluid pressures as to effect a muffler action to reduce the sound of discharging fluid and also prevents reaction or back pressure from the chamber 3 against the working parts of the compressor during the intermittent pulsations of the discharging fluid.

The above-described construction and operation of the compressor and of the check valve provide a quietly operating compressor device that is very powerful and efficient, as well as durable and compact, which cooperates with the other parts of the machine in a manner to be hereinafter described.

Figure 5:
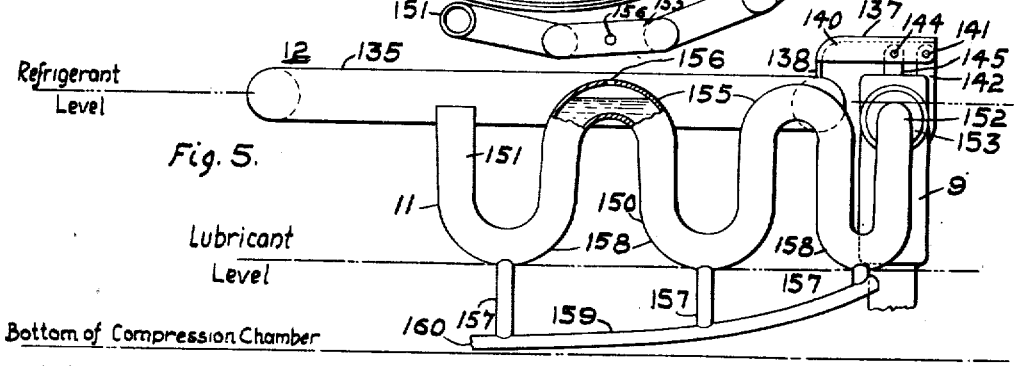
Fig. 5 is a side view of the members shown in Fig. 4.

The condensing chamber 3 contains a quantity of lubricating fluid 132, such as glycerine, and, above the latter, a quantity of refrigerating fluid 133, such as ethyl chloride, which, by reason of the respective specific gravities thereof, assume the levels indicated in Figs. 1 and 5. The float member 12 comprises a tubular, preferably brass, member 135 of substantially ring-shape that is so formed that it may conveniently surround the motor casing 7 to economize space and to provide sufficient buoyancy or lifting power to actuate the expansion valve 9. The float member 135 is connected to the valve 9 by a preferably sheet brass member 137 that is bent to constitute a lever arm having one end 138 secured in position in a sealed slot 139 in the float tube 135. Side portions 140, on the member 137, are adapted to receive a pin 141 that is supported in an arm 142 integrally formed on the valve 9 and a pin 144 that passes through a valve stem 145 in the valve 9. The valve stem operates in a chamber or bore 146 of the valve to open and close a passage 147 therein, in accordance with the position of the float member 135.

Figure 4:
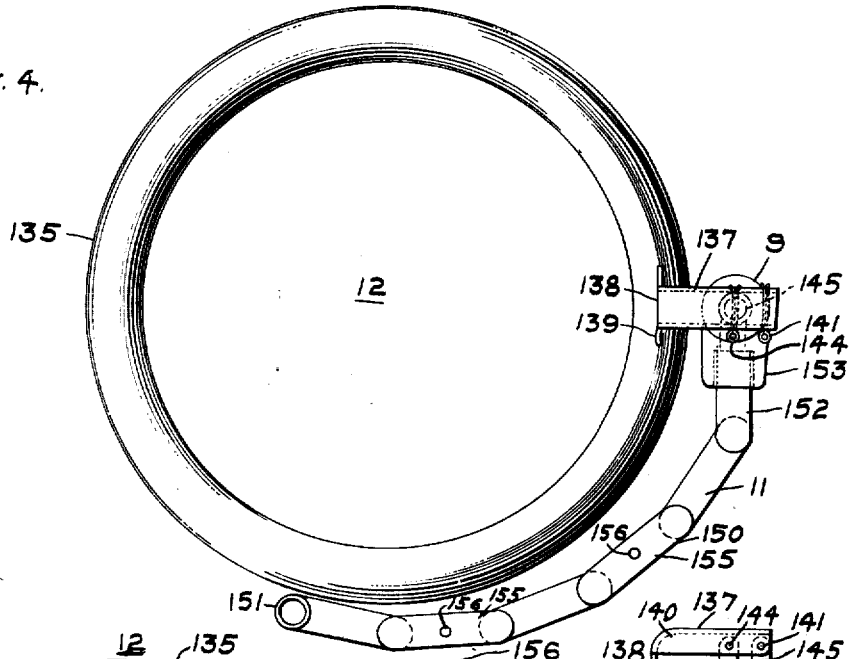
Fig. 4 is an enlarged plan view of a float member, a compression valve and a fluid separator forming parts of the invention.

The fluid-separator device 11, Figs. 4 and 5, comprises a preferably brass or copper tube 150 bent into vertical convolutions and into substantially arcuate form, as viewed from above. The tube 150 has an intake or overflow end 151, open at the top, and an end 152 fitted in and secured, as by a solder joint, to a tubular projection 153 that may be integral with the expansion valve 9. The upper bent portions 155 of the convolute tube 150 are preferably disposed slightly above the refrigerant level and are provided with openings 156 to equalize the pressures inside and outside of the tube. Vertically depending tubes 157 of different lengths, communicate, at their upper ends, with the lower bent portions 158 of the tube 150 and, at their lower ends, with a tube 159. The lower bent portions 158 of the tube 150 are disposed above the lubricant level. The tube 159 connects with the first lower bent portion 158, adjacent to the valve 9, at a position slightly below the lubricant level and is inclined downwardly from that position to an open lower end 160 thereof. There may be as many convolutions in the tube 150 as desired.

Referring to Figs. 1, 7, and 9, the casing or cylinder member 87 of the compressor 6 is provided with a vertically projecting portion 164 constituting a tertiary bearing for the shaft 62 and is provided with a vertical tapped opening 165 for the reception, by means of a bushing 166, of the upper end 167 of an auxiliary intake tube 168. The latter has a bent portion 169 from which the tube 168 extends to the lower end 170 thereof below the lubricant level.

A space 171 between the upper end of the shaft 62 and the opening 165 serves as a lubricant-receiving chamber, from which intersecting transverse and longitudinal openings or passages 172 and 173, respectively, extend to the interior of the casing 87.

By reason of the pressure exerted on the liquids in the condensing chamber, small quantities of the lubricant are forced or driven upwardly through the tube 168 and through the opening 165 to the chamber 171 in the bearing 164, and through the passages 172 and 173 to the interior of the casing 87 of the compressor to a position therein whereat there is no counter pressure. This operation serves to keep the compressor well lubricated and to seal the same between its pressure and vacuum sides or chambers.

The expansion device 5, Fig. 1, may comprise a bulb or dome 175, upper and lower members 176 and 177 of which are provided with flanges 178. The members 176 and 177 are held together and a packing ring or gasket 179 is compressed between the flanges 178 by bolts 180 which extend through the flanges 178 and are provided with nuts 181. The upper member 176 of the dome 175 is provided with an interiorly-threaded hollow boss or collar 183, into which one end of a member 184 of substantially T-shape is fitted. The member 184 has a bore 185 and a lateral tubular leg or portion 186 into which the tube 43 is fitted to provide communication between the bulb 175 and the intake port 88 of the compressor 6.

The member 184 may be provided with a solid exteriorly-threaded upper end portion 188 for disposition in a cooperatively-threaded opening 189 in the under side of the base plate 1 to support the expansion device 5.

The tube 39, of which the upper end 38 communicates with the expansion valve 9 through the opening 36 in the base plate 1, is helically coiled around the dome 175 and is connected, at its other end 191, to a hollow boss 192 at the lower end of the dome 175.

In operation, when the motor 7 is energized to actuate the compressor 6, the refrigerating fluid is drawn in gaseous form from the bulb 175, through the member 184, the tube 143, the opening 41 in the base plate 1, the tube 42 and the intake port 88 of the compressor to one of the chambers A and B in the latter and is compressed, as hereinbefore described. Being forced through the check valve 8 and into the condensing chamber 3, the latter is subjected to a relatively high pressure which is transmitted to the liquid refrigerant 133 and to the liquid lubricant 132 at the bottom of the chamber 3. The cooling medium circulating through the coiled tube 10, as hereinbefore described, absorbs heat from the gaseous refrigerant and causes the same to condense into liquid form, which liquid descends to the liquid refrigerant above the lubricant at the bottom of the chamber 3.

This condensing action causes the liquid level in the chamber 3 to rise and to thereby raise the float ring 135. When the float ring 135 is raised, it causes the valve stem 9 to open the passage 147 to permit the refrigerant, under pressure from the chamber 3, to pass into the tube 39. When a quantity of the refrigerant has been thus released, it causes a general movement of the liquid in the chamber 3 toward the valve 9.

Normally, there is a distinct line of separation between the refrigerant 133 and the lubricant 132, at the bottom of the condensing chamber 3, but, however, very small particles or globules of the lubricant, which may be carried by the refrigerant for a short time, may become suspended in the refrigerant. If not separated from the refrigerant, these particles of lubricant would cause the settlement of an appreciable quantity of the lubricant at the bottom of the expansion device 5. Thus, the refrigerating liquid carrying the particles of lubricant, must pass through the separator 11 before being admitted to the valve 9. Entering the open end 151 of the separator tube 150, the liquid passes, by siphon action, through the convolutions of the tube 150. During this passage, the particles of lubricating fluid, by reason of their greater density, descend through the tubes 157 to the tube 159 and down, through the latter, to the main body 132 of the lubricating liquid, while the refrigerating fluid passes on to the valve 9. As many convolutions in the separator tube 150 and as many of the tubes 157 may be provided as is found necessary to sufficiently separate out the particles of lubricating fluid from the refrigerating fluid.

As above described, nothing but substantially pure refrigerating liquid may pass into the valve 9.

Repeated cycles of the above-described operation occur during the operation of the machine to supply the expansion device 5 with compressed refrigerant which, when it is released by the valve 9, expands and passes through the tube 39 and into the dome 175. The expansion of the refrigerant in the tube 139 and the bulbs 175 causes an absorption of heat from the medium surrounding these members and, hence, a thick gathering of frost thereon. During the above-described refrigerating operation, lubricating liquid is forced through the tube 168 to lubricate the compressor. Portions of the lubricant, thus forced to the compressor, are forced outwardly through the check valve 8 to be returned to the main body 135 of the lubricating material. Other portions of the lubricant, that are conducted to the compressor through the tube 168, pass into the bearing portion 81 at the upper end of the motor 7 and, from the bearing portion 81, through a passage 190 in the shaft 62, to the lubricant cup 72 of the thrust bearing 69.

The passage 190, in the shaft 62, has a relatively short helical portion or groove 193 in the outer surface of the shaft above the packing ring 82. The shaft is machined off at a portion 194 to provide a diagonal shoulder 195 through which, and through the shaft 92 to a position below the packing ring 82, a diagonal hole 196 is drilled. The hole 196 communicates, at its lower end, with a side slot 197, similar to a keyway, that extends to the thrust bearing 69. The arrangement serves to lubricate the bearings 81 and 69 and to conduct the lubricant from a position above to a position below the packing ring 82.

While the packing ring 82 is provided to retard, or to prevent as far as possible, the lubricating and refrigerating liquids passing into the motor casing 15, should any appreciable amount of the liquids so pass into the motor casing, it will descend to the deflector member 85. The rotation of the deflector member 85 causes the liquids therein to be thrown against the inner walls of the motor casing 15, above the field and armature structures thereof, from which position the liquids pass between the ribs 77 and the outer perimeter of the field magnet structure 74 to the bottom of the motor casing, which is formed by a portion of the base plate 1. Since this portion of the motor casing communicates, through the check valve 48 and the passages 47 and 45 in the base plate 1, with the tube 42 that is connected to the intake port of the compressor 6, any liquid deposited at the bottom of the motor casing will be drawn from the motor casing and conducted to the compressor. In the compressor, this fluid joins the other fluids to again pass through one of the fluid-flow cycles, as described.

When operation of the machine is stopped, the refrigerant in the expansion device 5 continues to form gas which ultimately destroys the vacuum in the expansion device and builds up a slight pressure. This pressure is prevented from forcing the refrigerant into the motor casing 15 by the check valve 48, the ball 44 of which is forced against the opening 40. The check valve 48 thus readily permits the egress of fluids from the motor casing, during the vacuum action, but prevents the passage of fluids into the motor casing therethrough.

Heretofore, it has been usual to place a check valve at the inlet port of compressors and to have the outlet port freely communicating with the compression chamber, so that the pressure in the compression chamber acted against the compressor. By placing the check valve in the outlet port, the above objection is eliminated and the compressor rendered more effective.

The operation of the device is preferably started and stopped automatically, depending upon the temperature of the medium which it is desired to cool, by any suitable means (not shown), forming no part of this invention.

Figure 6:
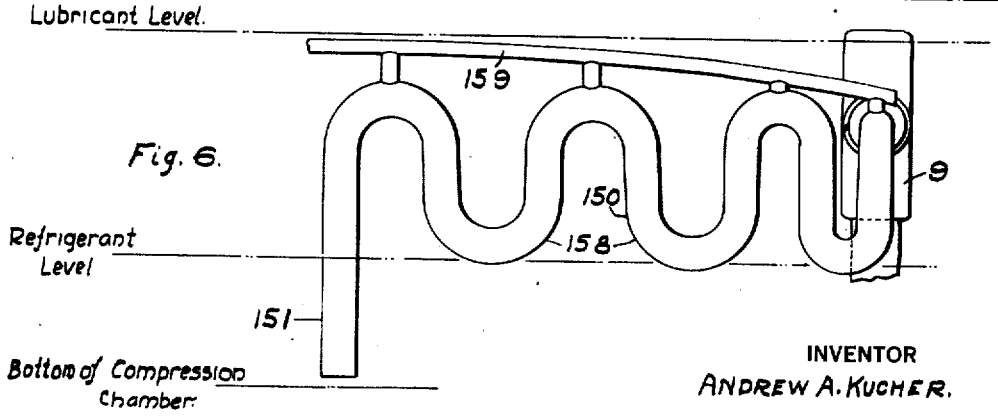
Fig. 6 is a view, similar to Fig. 5, of a modified form of the members shown in Fig. 4.

As shown in Fig. 6, in which similar parts are designated by similar reference characters, another form of the separator 11 is adapted for separating a lubricant that is of less specific gravity than the refrigerating medium, by having its open or intake end 151 at a lower portion thereof rather than at an upper portion, as in the forms shown in Figs. 4 and 5.

In this form of the separator 11, the tube 159, instead of extending from the bottom of the tube 150, extends from the upper side thereof to a position adjacent to the upper level of the lubricant.

The machine is compact, quiet and effective in operation, economical to manufacture and has many other features which render it particularly desirable and adaptable for household use.

For brevity and convenience of expression in the specification and claims, the term "condensing chamber" is employed to include, unless otherwise indicated, the base member 1 and shell 2. The term "compressor" to include the casing 87 and operating elements therein contained.

While I have shown and described a particular form of my invention, many changes may be effected therein without departing from the spirit and scope thereof, as set forth in the appended claims.

I claim as my invention:

1. In a refrigerating machine in which a refrigerant fluid is successively vaporized, compressed and condensed in a repeating cycle, the combination with a chamber in which a change of state of the refrigerant fluid is effected, of a compressor and actuating motor therefor enclosed within said chamber disposed in a lower portion of the chamber so that the heat of the motor is dissipated at least in part through the intermediary of the condensed refrigerant.

2. In a refrigerating machine in which a refrigerant is vaporized, compressed and condensed in a repeating cycle, in combination, an expansion chamber, a condensing chamber, means for delivering condensed refrigerant from the condensing chamber to the expansion chamber, means including a compressor for withdrawing expanded refrigerant from the expansion chamber and delivering it to the condensing chamber, and a motor for actuating said compressor, said motor being enclosed in a lower portion of one of the said chambers so that the heat of the motor is dissipated at least in part through the intermediary of the condensed refrigerant.

3. In a refrigerating machine in which a refrigerant fluid is successively vaporized, compressed and condensed in a repeating cycle, the combination with a chamber in which a change of state of the refrigerant fluid is effected, of a compressor and an actuating motor therefor enclosed within said chamber in position to be at least partially surrounded by condensed refrigerant when in operation in order that the heat generated in the motor may be dissipated, at least in part, through the cooling action of the condensed refrigerant.

4. In a refrigerating machine in which a refrigerant fluid is vaporized, compressed and condensed, the combination with a chamber in which a change of state of the refrigerant fluid is effected and comprising a base member, of a motor mounted upon the base member and disposed within a lower portion of the chamber so that the heat of the motor is dissipated at least in part through the intermediary of the condensed refrigerant, and a compressor within the chamber actuated by the motor.

5. In a refrigerating machine in which a refrigerant fluid is vaporized, compressed and condensed, the combination with a generally cylindrical chamber in which a change of state of the refrigerant fluid is effected, of a rotary compressor, a rotary actuating motor for said compressor, said motor and said compressor being disposed in adjacent end-to-end relation within said chamber, the axes of the compressor and motor extending in the direction of the axis of the cylindrical chamber.

6. In a refrigerating machine in which a refrigerant fluid is vaporized, compressed and condensed, in combination, an expansion chamber, a condensing chamber, means for delivering refrigerant from the condensing chamber to the expansion chamber, means including a compressor for withdrawing expanded refrigerant from the expansion chamber and delivering it to the condensing chamber, a motor for actuating said compressor disposed inside the condensing chamber, and a tube through which a cooling fluid is circulated in effective cooling proximity to a portion of the motor.

7. In a refrigerating machine in which a refrigerant fluid is vaporized, compressed and condensed, the combination with a condensing chamber, of a compressor and actuating motor therefor disposed inside the condensing chamber, and a tube through which a cooling fluid is circulated coiled around and in effective cooling proximity to portions of the motor and of the compressor.

8. In a refrigerating machine in which a refrigerant fluid is successively vaporized, compressed and condensed in a repeating cycle, the combination with a chamber in which a change of state of the refrigerant fluid is effected, of a motor disposed within said chamber and comprising a substantially fluid tight housing for the operating parts of said motor.

9. In a refrigerating machine in which refrigerant fluid is vaporized, compressed and condensed, the combination with a chamber in which a change of state of the refrigerant fluid is effected, of a motor disposed within said chamber and comprising a substantially fluid tight housing for the operating parts of said motor, and a fluid-proof protective covering of insulating material impervious to the refrigerant fluid for portions of the operating parts of said motor.

10. In a refrigerating machine in which a refrigerant fluid is vaporized, compressed and condensed, the combination with a chamber in which a change of state of the refrigerant fluid is effected, of a motor within the said chamber having a substantially totally closed casing, and means constituting a fluid withdrawal path extending between the interior of the said casing and the said chamber.

11. In a refrigerating machine in which a refrigerant fluid is vaporized, compressed and condensed, the combination with a chamber in which a change of state of the refrigerant fluid is effected, of a motor within the said chamber having a substantially totally closed casing, and means operated by the motor for evacuating the casing of the motor.

12. In a refrigerating machine in which a refrigerant fluid is vaporized, compressed and condensed, the combination with a chamber in which a change of state of the refrigerant fluid is effected, of a motor within the said chamber having a substantially totally closed casing, a periodically operated means for evacuating the casing of the motor, and means for preventing the ingress of fluid to the casing of the motor when the evacuating means is not in operation.

13. In a refrigerating machine in which a refrigerant fluid is vaporized, compressed and condensed, the combination with a chamber in which a change of state of the refrigerant fluid is effected, of a motor within the said chamber having a substantially totally closed casing, and a compressor actuated by the motor and connected to the motor casing for evacuating said casing.

14. In a refrigerating machine in which a refrigerant fluid is vaporized, compressed and condensed, in combination, a condensing chamber, an expansion chamber, a motor and a compressor, a fluid-tight casing enclosing the motor and compressor, partition means dividing the casing into a compartment for the motor and a compartment for the compressor, and means connecting the compressor with the motor compartment and with the expansion chamber, for evacuating both the motor compartment and the expansion chamber.

15. In a refrigerating machine in which a refrigerant fluid is vaporized, compressed and condensed, the combination with a chamber in which a change of state of the refrigerant fluid is effected, of a compressor and actuating motor therefor enclosed within said chamber, said motor comprising a substantially closed housing for the operating parts of the motor, drive shaft means for said compressor and motor, and a deflector to protect the interior parts of the motor from contact with liquids entering into the said housing about said shaft means.

16. In a refrigerating machine in which a refrigerant fluid is vaporized, compressed and condensed, the combination with a compressor and a chamber in which a change of state of the refrigerant fluid is effected, the chamber comprising a base member, of an electric motor for actuating said compressor disposed within said chamber and comprising a substantially fluid-tight casing mounted upon said base member, and conducting leads extending from the exterior of said chamber through said base member into the interior of the motor casing.

17. In a refrigerating machine in which a refrigerant fluid is vaporized, compressed and condensed, the combination with a compressor and a chamber in which a change of state of the refrigerant fluid is effected, the chamber comprising a base member, of an electric motor for actuating said compressor disposed within said chamber and comprising a substantially fluid-tight casing mounted upon said base member, and means extending longitudinally and laterally through the base member for conducting energy to the motor.

18. In a refrigerating machine in which a refrigerating fluid is vaporized, compressed and condensed, the combination with a condensing chamber and comprising a base member, of a compressor and actuating motor therefor disposed inside the condensing chamber, a tube for circulating cooling fluid in said chamber, and means constituting a fluid-conducting passage from the exterior of the chamber laterally through the base member to said tube.

19. In a refrigerating machine in which a refrigerant fluid is vaporized, compressed and condensed, a condensing chamber, an expansion chamber, a compressor comprising a casing member, and a motor for actuating the compressor and comprising a casing, the casing of the motor constituting a closure for the casing of the compressor.

20. In a refrigerating machine in which a refrigerant fluid is vaporized, compressed and condensed, the combination with a chamber in which a change of state of the refrigerant fluid is effected, of end-to-end connected rotary motor and rotary compressor within said chamber, the compressor being mounted upon said motor, and the said chamber including a wall upon which the motor is supported.

21. In a refrigerating machine, in combination, a condensing chamber having a plurality of nonmiscible liquids therein lying in substantially segregated layers, an expansion chamber, means constituting a communicating passage between one of said liquid layers and the expansion chamber, and means within the condensing chamber constituting a liquid withdrawal path connected to said passage for separating out substantially all trace of other liquid, in order that said first liquid only may pass into the expansion chamber.

22. In a refrigerating machine, in combination, a condensing chamber having a refrigerant liquid and a liquid lubricant of a different specific gravity therein, an expansion chamber, means constituting a communicating passage between the condensing and the expansion chambers and disposed to withdraw the refrigerant liquid from the condensing chamber into the expansion chamber, and means within the condensing chamber constituting a fluid withdrawal path connected to said passage means for separting out substantially all trace of said lubricant, in order that said refrigerant only may pass into the expansion chamber.

23. In a refrigerating machine in which a refrigerant fluid is vaporized, compressed and condensed, the combination with a condensing chamber having a body of liquid lubricant therein, of a compressor disposed within the chamber above the lubricant level, and means for conducting portions of lubricant to the compressor.

24. In a refrigerating machine of the compression-expansion type, the combination with a condensing chamber having a body of lubricant therein, of a motor within the chamber having a substantially closed casing, a compressor actuated by the motor and connected to the motor casing for evacuating said casing, means dependent upon the pressures within said chamber and said casing for conducting lubricant to the compressor and motor bearings, and means permitting the excess lubricant to be withdrawn to the compressor through said motor casing evacuation means.

25. In a refrigerating machine of the compression-expansion type, the combination with a condensing chamber having a body of lubricant therein, of a motor within the chamber having a substantially closed casing, a vertically disposed shaft adapted for rotation in upper and lower bearings of the motor, a compressor actuated by the motor and connected to the motor casing for evacuating said casing, means dependent upon the pressures within said chamber and said casing for conducting lubricant to the motor bearings, and means permitting the excess lubricant to be withdrawn to the compressor through said motor casing evacuation means.

26. In a refrigerating machine in which a refrigerant fluid is vaporized, compressed and condensed, the combination comprising a condensing chamber, a compressor and motor disposed within said chamber and means for deflecting liquids from the operating parts of said motor.

27. A refrigerating machine in which a refrigerant fluid is vaporized, compressed and condensed, including a condensing chamber comprising a casing member, a compressor comprising a casing member, and a motor for actuating the compressor and comprising a casing, the casing of the motor constituting a closure for the casing of the compressor and the casing of the condensing chamber constituting a closure for the casing of the motor.

28. In a refrigerating machine in which a refrigerant fluid is vaporized, compressed and condensed, the combination with an evaporator, and a condenser, of a motor and a compressor, a fluid-tight casing enclosing the motor and compressor, a partition wall forming with the casing a compartment for the compressor and a compartment for the motor, and means for evacuating the motor compartment.

29. In a refrigerating chamber in which a refrigerant fluid is vaporized, compressed and condensed, the combination with a chamber in which a change of state of the refrigerant fluid is effected, of a motor adjacent said chamber and having a casing, means for evacuating the casing of the motor and means for preventing the ingress of fluid to the casing of the motor when the evacuating means is not in operation.

30. In a refrigerating apparatus in which a refrigerant is successively vaporized, compressed and condensed in a repeating cycle, the combination with a chamber in which a change of state of the refrigerant fluid is effected of a compressor and an actuating motor therefor enclosed within said chamber in position to be at least partially surrounded by condensed refrigerant when in operation, whereby to permit heat exchange between said motor and the condensed refrigerant.

31. In a refrigerating apparatus, in combination a condenser, an evaporator, a compressor, a motor for driving the compressor, a fluid-tight casing entirely enclosing both the motor and compressor, a partition providing with the casing a compartment for the motor and a compartment for the compressor, means in the partition for permitting the passage of gaseous refrigerant from the evaporator to the compressor, and means permitting the evacuation of the motor compartment through the first named means.

32. In a refrigerating apparatus, in combination a condenser, an evaporator, a compressor, motor for driving the compressor, a fluid-tight casing entirely enclosing both the motor and compressor, a partition providing with the casing a compartment for the motor and a compartment for the compressor, means in the partition extending substantially transversely of the axis of the partition for permitting the passage of gaseous refrigerant from the evaporator to the compressor, and means connecting the motor compartment with the transverse means whereby to permit evacuation of the motor compartment through said transverse means.

33. In a refrigerating apparatus, in combination a condenser, an evaporator, a compressor, motor for driving the compressor, a fluid-tight casing entirely enclosing both the motor and compressor, a partition providing with the casing a compartment for the motor and a compartment for the compressor, a conduit extending substantially transversely of the axis of the partition for permitting the passage of gaseous refrigerant from the evaporator to the compressor, and a conduit connecting the motor compartment with the transverse conduit.

34. In a refrigerating apparatus, the combination of an evaporator, a condenser, a compressor, a motor for driving the compressor, a fluid-tight casing entirely enclosing both the motor and the compressor, and partition means provided in the casing and forming with the casing a compartment for housing the motor and a second compartment for both housing the compressor and for storing lubricant and compressed refrigerant.

35. In a refrigerating apparatus, the combination of an evaporator, a condenser, a compressor, a motor for driving the compressor, a fluid-tight casing entirely enclosing both the motor and the compressor, and partition means provided in the casing and forming with the casing a compartment for housing the motor and a compartment for housing the compressor, means connecting the intake port of the compressor with the motor compartment and means connecting the outlet port of the compressor to the compressor compartment.

36. In a refrigerating apparatus, the combination of an evaporator, a condenser, a compressor, a motor for driving the compressor, a fluid-tight casing entirely enclosing both the motor and the compressor, and partition means provided in the casing and forming with the casing a high pressure compartment and a low pressure compartment, the compressor located in the high pressure compartment, the motor located in the low pressure compartment, and means permitting evacuation of the low pressure compartment through the compressor to the high pressure compartment, when the compressor is operated.

37. In a refrigerating apparatus, the combination of an evaporator, a condenser, a compressor, a motor for driving the compressor, a fluid-tight casing entirely enclosing both the motor and the compressor, and partition means provided in the casing and forming with the casing a compartment for housing the motor and a compartment for housing the compressor, and means permitting communication between the high and low pressure compartments only while the compressor is operating.

38. A refrigerating apparatus, comprising a closed casing, a partition wall dividing the casing into a suction chamber and a pressure chamber, a compressor in said casing and a driving motor therefor disposed in the suction chamber.

39. In a refrigerating apparatus, the combination of condensing means, evaporating means, a compressor, a motor for driving the compressor, a hermetically sealed casing enclosing the motor and the compressor, partition means dividing the casing into a motor compartment and a compressor compartment, communicating means provided between the outlet of the compressor and the compressor compartment, and communicating means provided between the inlet of the compressor and the motor compartment, whereby the suction and discharge pressures of the compressor prevail in the motor compartment and the compressor compartment, respectively.

40. In a refrigerating apparatus, the combination of an evaporator, a condenser, a compressor, a motor for driving the compressor, a fluid-tight casing enclosing both the motor and the compressor, a wall member provided in the casing and dividing the same into a motor compartment and a compressor compartment, and passageway means for providing communication between the evaporator and the compressor, a portion of said passageway means being located in the wall member.

41. In refrigeration apparatus, the combination of a compressor, a motor for driving the compressor, a frame structure for at least partially supporting the motor and compressor, said frame structure forming a housing for the motor, and a hermetically-sealed casing formed separately from the frame structure for enclosing the motor and compressor, said motor housing engaging with the hermetically-sealed casing.

42. In refrigeration apparatus, the combination of a compressor, a motor for driving the compressor, a unitary frame structure for at least partially supporting the motor and the compressor, said frame structure forming a housing for the motor, a hermetically sealed casing formed separately from the frame structure for enclosing the motor, the compressor and the frame structure, said casing comprising a plurality of detachable parts and said motor housing engaging at least one of the parts, and means for sealing the casing.

43. In refrigeration apparatus, the combination of a compressor, a motor for driving the compressor, a single frame structure for at least partially supporting the motor and the compressor assembly, said frame structure embodying a housing for the motor; a hermetically sealed casing formed separately from the compressor and the motor housing for totally enclosing the motor and the compressor, said casing engaging the motor housing and embodying attachable portions telescopically assembled about the motor-compressor assembly.

44. In refrigerating apparatus, the combination of a compressor, said compressor embodying stationary and movable elements, a motor for driving the compressor, said motor embodying a stator and a rotor, a frame member for at least partially supporting the motor and compressor in assembled relation, a hermetically-sealed casing for totally enclosing the motor and the compressor and supporting the frame member, said casing being formed separately from the compressor stationary element and of a plurality of attachable parts at least one of which is removable to provide access to the rotor and stator of the motor while disposed in their normal assembled relation.

45. In refrigerating apparatus, the combination of a compressor, said compressor embodying stationary and movable elements, a motor for driving the compressor, said motor embodying a stator and a rotor, a frame member for at least partially supporting the motor and compressor in assembled relation, a hermetically sealed casing for totally enclosing the motor and the compressor, said casing being formed separately from the compressor stationary element and of a plurality of attachable parts, at least one of which supports the frame and all of which are detachable to provide access to the rotor and stator of the motor and the compressor while disposed in their normal assembled relation.

46. In refrigerating apparatus, a compressor, a motor mechanically connected to the compressor and including stator and rotor elements, a hermetically sealed refrigerant containing casing for totally enclosing the motor and compressor, a frame member for supporting the compressor and embodying bearing means for the rotor element, said frame member being wholly enclosed within the casing and having means extending parallel to the motor axis and arranged in overlapping relation with respect to the stator element to hold the latter in proper relation with respect to the rotor element, said last means being disposed in metallic engagement with the casing to conduct heat away from the motor.

47. In refrigerating apparatus, a compressor, a motor mechanically connected to the compressor and including stator and rotor elements, a casing for hermetically sealing the motor and the compressor and for containing refrigerant fluid, and a frame for supporting the compressor and having bearing means for the rotor, said frame being removable from the casing and having a sleeve portion encompassing the stator to hold the latter in proper relation with respect to the rotor and the sleeve portion and said casing being constructed and arranged to provide for support of the frame from the casing through the intermediary of the sleeve portion.

48. In a refrigerating apparatus, the combination of an evaporator, a compressor, a motor for driving the compressor, a hermetically-sealed casing entirely enclosing both the motor and compressor and partition means provided interiorly of the casing and forming with the casing a compartment for housing the motor and a second and single compartment for both housing and compressor and for storing lubricant, said motor and compressor being on opposite sides of the partition means with the compressor supported entirely by said means, and a drive shaft connecting said motor directly with the compressor and passing through said means whereby the compressor is driven at substantially motor speed.

49. In a refrigerating apparatus, the combination of a receptacle, a compressor disposed therein, a motor chamber, a motor disposed therein, a shaft structure for transmitting torque from the motor to the compressor, bearing means for said shaft structure provided in the compressor, additional bearing means for said shaft structure interposed between the motor and the compressor, means for maintaining within the receptacle a body of lubricant liquid under pressure, means for maintaining a vacuum in the motor chamber, and means subject to the difference in pressure between the receptacle and the motor chamber for conveying the lubricating liquid to the bearing means provided in the compressor, and to the bearing means interposed between the compressor and the motor.

50. In a lubricating system for a refrigerating apparatus, the combination with a rotary compression mechanism, a receptacle containing lubricant and subject to the discharge pressure of the compression mechanism, a motor for driving the compression mechanism, a housing for the motor, and conduit means for taking lubricant under pressure from the receptacle and conveying it first to the working parts of the compressor, thence into the motor housing and from the motor housing to the refrigerant inlet portion of the compression mechanism, whereby a flow of lubricant is induced from the receptacle through the compression mechanism to the motor housing.

51. In a refrigerating apparatus, the combination of a receptacle, means for maintaining a body of lubricant under pressure within the receptacle, a compressor, a motor, a shaft structure for transmitting torque from the motor to the compressor, a bearing for the shaft interposed between the motor and the compressor, a second bearing for the shaft provided on the oppositely disposed side of the compressor, a third bearing for supporting the shaft provided on the oppositely disposed side of the motor, means for conveying lubricant from the receptacle to the bearings in series, and means for utilizing the suction of the compressor to remove the lubricant from the bearing last in the series.

52. In a refrigerating apparatus, the combination of a compressor, a motor chamber, a motor disposed therein, a shaft structure associated with the motor, a bearing provided in the motor chamber for supporting the shaft, means for supplying a lubricant to the bearing, communicating means between the inlet of the compressor and the motor chamber for removing lubricant discharged from the bearing and for maintaining a vacuum within the motor chamber, and means interposed between the motor and the inlet of the communicating means for preventing lubricant, which may flow back upon a stoppage of the compressor, from impinging upon the motor.

53. In a refrigerating apparatus, the combination of a lubricant receptacle, a compressor, a motor, a shaft structure for transmitting torque from the motor to the compressor, bearings for the shaft structure provided in the motor, an additional bearing for the structure provided in the compressor, means for taking lubricant from the receptacle and conveying it first to the compressor bearing and then to the motor bearings, and means for utilizing the suction produced by the compressor for returning the lubricant discharged by the bearings to the receptacle.

54. In a lubricating system for the compression mechanism of a refrigerating apparatus, the combination of a casing, partition means dividing the casing into a motor compartment and a compressor compartment, a drive shaft for the motor extending through the partition means and operatively connecting the motor to the compressor, a bearing for the drive shaft provided in the partition means, means for retaining a body of lubricant under pressure in the compressor compartment, means for conveying lubricant from the compressor compartment to the bearing located in the partition means, and means for utilizing the pumping action of the compressor for returning to the compressor compartment lubricant drainage accumulated in the motor compartment.

55. In a lubricating system for the compression mechanism of a refrigerating apparatus, the combination of a casing, partition means dividing the casing into a motor compartment and a compressor compartment, a drive shaft for the motor extending through the partition means and operatively connecting the motor to the compressor, a bearing for the drive shaft provided in the partition means, a second bearing for the motor drive shaft provided in the motor compartment, means for retaining a body of lubricant subject to the discharge pressure of the compressor in the compressor compartment, means for conveying lubricant from the compressor compartment to the first and second bearings of the motor and means for conveying lubricant drainage accumulating in the motor compartment to the inlet passageway of the compression mechanism.

56. In a lubricating system for the compression mechanism of a refrigerating apparatus, the combination of a casing, partition means dividing the casing into a motor compartment and a compressor compartment, a drive shaft for the motor extending through the partition means and operatively connecting the motor to the compressor, a bearing for the drive shaft provided in the partition means, a second bearing for the motor drive shaft provided in the motor compartment, means for retaining a body of lubricant under pressure in the compressor compartment, means embodied in the motor shaft for conveying lubricant from the compressor compartment to the second bearing, and means utilizing the pumping action of the compressor for returning to the compressor compartment lubricant drainage accumulating in the motor compartment.

57. In a lubricating system for the compression mechanism of a refrigerating apparatus, the combination of a compressor, a motor for driving the compressor, a fluid-tight casing enclosing both the motor and the compressor, partition means dividing the casing into a motor compartment and a compressor compartment, communicating means provided between the outlet of the compressor and the compressor compartment and communicating means provided between the inlet of the compressor and the motor compartment, whereby the suction and discharge pressures of the compressor are communicated to the motor compartment and the compressor compartment respectively, and means subject to the difference in pressures prevailing between the compressor compartment and the motor compartment for effecting lubrication of the compression mechanism.

58. In a lubricating system, a motor, a rotary compressor, a lubricant containing receptacle subject to the discharge pressure of the compressor, means for taking lubricant from the receptacle and conveying it first through the compressor and then to the working parts of the motor before returning it to the receptacle, and means for returning lubricant from the working parts of the motor to said receptacle.

59. In a lubricating system, the combination of a motor, a compressor driven by the motor, a receptacle containing lubricant and subject to the discharge pressure of the compressor, means for taking lubricant from the receptacle and conveying it first to the working parts of the compressor and then to the working parts of the motor in series before returning it to the receptacle, and means for then returning the lubricant from the working parts of the motor to said receptacle.

60. In a lubricating system, the combination of a motor, a rotary compressor, a lubricant containing receptacle subject to the discharge pressure of the compressor, means for taking lubricant from the receptacle and conveying it first to the compressor to seal and lubricate the same and then to the working parts of the motor before returning it to the receptacle, and means for then returning lubricant from the working parts of the motor to the receptacle.

61. In mechanical refrigerating apparatus, the combination of a compressor, a motor for driving the compressor, a fluid-tight casing enclosing both the motor and the compressor, means dividing the casing into a compartment for housing the motor and a single compartment for both housing the compressor and for containing lubricant, means for subjecting the compressor compartment to the discharge pressure of the compressor and the motor compartment to the suction pressure of the compressor to provide for forced circulation of lubricant to the motor compartment.

62. A lubricating system for the compression mechanism of a refrigerating apparatus, the combination of a compressor, a motor having a drive shaft operatively connected to the compressor, said drive shaft being provided with an interior passageway adapted to convey lubricant, a receptacle containing lubricant under pressure, means including the interior passageway for conveying lubricant to the working parts of the motor, and means for utilizing the pumping action of the compressor for returning to the receptacle lubricant discharged from the working parts of the motor.

63. In a refrigerating apparatus, wherein a refrigerant is successively compressed, condensed and evaporated, a compressor, a motor for driving the compressor, a member for supporting the motor and compressor and maintaining them in operative relation, and a casing for housing the motor, compressor and supporting member, parts of said motor being in intimate thermal contact with said supporting member and parts of said supporting member being in intimate thermal contact with said casing.

64. In a lubricating system for the compression mechanism of a refrigerating apparatus, the combination of a casing, partition means dividing the casing into a motor compartment and a compressor compartment, a drive shaft extending through the partition means and operatively connecting the motor and compressor, a bearing for the drive shaft, a reservoir of lubricant contained in the compressor compartment, means for conveying lubricant from the reservoir to said bearing, and means for subjecting the motor compartment to the suction pressure of the compressor for returning to the compressor compartment lubricant drainage accumulated in the motor compartment.

ANDREW A. KUCHER.

CERTIFICATE OF CORRECTION.

Reissue No. 19,908. March 31, 1936.

ANDREW A. KUCHER.

It is hereby certified that error appears in the printed specification of the above numbered patent requiring correction as follows: Page 6, second column, line 56, claim 22, for "separting" read separating; page 8, second column, line 51, claim 48, for "and" first occurrence, read the; and that the said Letters Patent should be read with these corrections therein that the same may conform to the record of the case in the Patent Office.

Signed and sealed this 5th day of May, A. D. 1936.

(Seal)

Leslie Frazer
Acting Commissioner of Patents.

DISCLAIMER

Re. 19,908.—*Andrew A. Kucher*, Dayton, Ohio. REFRIGERATING MACHINE. Patent dated March 31, 1936. Disclaimer filed February 12, 1944, by the assignee, *Westinghouse Electric & Manufacturing Company*.

Hereby enters this disclaimer to claims 41 to 45 inclusive, and claim 47 of said patent.

[*Official Gazette March 14, 1944.*]